United States Patent
Nagai et al.

(10) Patent No.: US 7,658,791 B2
(45) Date of Patent: *Feb. 9, 2010

(54) ANTICORROSIVE COATING COMPOSITIONS

(75) Inventors: Masanori Nagai, Otawara (JP); Tsuyoshi Matsumoto, Otawara (JP); Takashi Matsuda, Otawara (JP); Osamu Ogawa, Otawara (JP)

(73) Assignee: Dai Nippon Toryo Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/667,750

(22) PCT Filed: Nov. 16, 2005

(86) PCT No.: PCT/JP2005/021029

§ 371 (c)(1),
(2), (4) Date: May 15, 2007

(87) PCT Pub. No.: WO2006/054593

PCT Pub. Date: May 26, 2006

(65) Prior Publication Data

US 2008/0000383 A1      Jan. 3, 2008

(30) Foreign Application Priority Data

Nov. 17, 2004    (JP) .............................. 2004-333212
Nov. 17, 2004    (JP) .............................. 2004-333213

(51) Int. Cl.
  *C09D 201/00*   (2006.01)
  *C09D 5/08*     (2006.01)
  *C09D 7/12*     (2006.01)
  *C23F 11/00*    (2006.01)

(52) U.S. Cl. .............. 106/14.44; 106/14.05; 106/14.41; 106/462; 524/123; 524/414

(58) Field of Classification Search ............... 106/14.05, 106/14.44, 462, 14.41; 524/123, 414
See application file for complete search history.

(56) References Cited

U.S. PATENT DOCUMENTS 6,139,616 A * 10/2000 Nagayama et al. .......... 106/431
6,548,188 B1 * 4/2003 Yanase et al. ............... 428/626
2007/0012220 A1 * 1/2007 Matsuda et al. ............. 106/462

FOREIGN PATENT DOCUMENTS

| JP | 56-047458    | 4/1981  |
| JP | 60-038471    | 2/1985  |
| JP | 62-68852 A * | 3/1987  |
| JP | 03-95277 A * | 4/1991  |
| JP | 05-230277 A* | 9/1993  |
| JP | 05-239376    | 9/1993  |
| JP | 05-339004    | 12/1993 |
| JP | 06-316678    | 11/1994 |
| JP | 07-138775    | 5/1995  |
| JP | 07-145340    | 6/1995  |
| JP | 08-283619    | 10/1996 |
| JP | 11-049975    | 2/1999  |
| JP | 11-049976    | 2/1999  |
| JP | 11-49977     | 2/1999  |
| JP | 2001-087707  | 4/2001  |
| JP | 2003-113482  | 4/2003  |

OTHER PUBLICATIONS

Derwent Patent Abstract No. 1981-44851D, abstract of Japanese Patent Specification No. JP56-047458A (Apr. 1981).*

* cited by examiner

*Primary Examiner*—Anthony J Green
(74) *Attorney, Agent, or Firm*—Frommer Lawrence & Haug LLP; Ronald R. Santucci

(57) ABSTRACT

It is an object of the present invention to provide an anticorrosive coating composition which uses a pollution-free (heavy metal-free) rust preventive pigment and exhibits anticorrosive performances equal or superior to those of lead compounds or chromic acid compounds even if the pigment is blended in various binder resins and also to provide an anticorrosive coating composition having excellent storage stability. The present invention relates to an anticorrosive coating composition comprising a binder resin and a pollution-free (heavy metal-free) rust preventive pigment containing a condensed calcium phosphate produced by baking a single substance or mixture of a calcium component and a phosphorous component in the following atomic ratio (Ca/P=m): $0.50 < m < 1.00$, at 180 to 350° C.

9 Claims, No Drawings

ANTICORROSIVE COATING COMPOSITIONS

This application is a 371 of PCT/JP2005/021029 filed on Nov. 16, 2005, published on May 26, 2006 under publication number WO 2006/054593 A1 which claims priority benefits from Japanese Patent Application Number 2004-333212 filed Nov. 17, 2004 and Japanese Patent Application Number 2004-333213 filed Nov. 17, 2004, the enclosures of which are hereby incorporated by reference.

TECHNICAL FIELD

The present invention relates to a pollution-free anticorrosive coating composition excluding heavy metals such as lead and chromium. More specifically, the present invention relates to an anticorrosive coating composition to which all binder resins can be applied by using a pollution-free rust preventive pigment having a specified composition and to an anticorrosive coating composition having excellent storage stability.

BACKGROUND ART

Lead compounds and chromium compounds have been widely used as rust preventive pigments so far. These compounds have a high rust preventive effect, but, on the other hand, have toxicity problems and therefore, pollution-free rust preventive pigments are being enthusiastically developed. However, the developments of pollution-free pigments having the same durability as lead compounds or chromic acid compounds have been made only insufficiently.

There are a variety of coating systems and many coating forms corresponding to these systems. Therefore, rust preventive pigments to be formulated in these coatings differ depending on the coating form and the form of a binder resin.

When the binder resin is an alkyd resin or chlorinated rubber type resin, pollution-free rust preventive pigments reduced in surface activity are frequently used to prevent these pigments from reacting with the resin in lead suboxide, lead cyanamide and a coating. These pollution-free rust preventive pigments reduced in surface activity have an adverse effect on anticorrosive characteristics and therefore scarcely exhibit the same anticorrosive characteristics as a lead type or a chromium type. When the binder resin is an epoxy resin, polyester resin or acrylic resin, strontium chromate, lead chromate, zinc chromate, zinc phosphate or aluminum tripolyphosphate is used (see Patent Reference 1 and 2). The resin has a large effect on the cutoff of corrosive factors and the effect of the rust preventive is not significant. However, if the effect of the rust preventive pigment is significant, a highly durable coating is obtained, leading to the production of a thinner film and process savings that have been desired in coating fields.

Also, when these pollution-free rust preventive pigments contain zinc type pigments (see, Patent Reference 3), there is a problem concerning storage stability in an oil type or alkyd resin type binder. Specifically, the rust preventive pigment coagulates with time in the oil type or alkyd resin type binder. If such a coagulated anticorrosive coating composition is used, not only the condition of coating surface is impaired but also the rust preventive effect is eventually deteriorated. The reason of such a change with time is considered to be that a free fatty acid in the alkyd resin type binder adsorbs to the surface of the zinc type pigment and the zinc type pigments to which the free fatty acid is adsorbed are gradually associated and coagulated while the composition is stored.

Patent Reference 1: Japanese Patent Application Laid-Open (JP-A) No. 8-283619
Patent Reference 2: JP-A No. 2003-113482
Patent Reference No. 3: JP-A No. 60-38471.

DISCLOSURE OF THE INVENTION

The present invention provides an anticorrosive coating composition which uses a pollution-free (heavy metal-free) rust preventive pigment and also, exhibits anticorrosive ability equal or superior to a lead compound or a chromic acid compound even if this pigment is blended in various binder resins, and also an anticorrosive coating composition having high storage stability.

The present invention relates to an anticorrosive coating composition comprising a binder resin and a pollution-free (heavy metal-free) rust preventive pigment containing a condensed calcium phosphate produced by baking a single substance or mixture of a calcium component and a phosphorous component in the following atomic ratio (Ca/P=m): $0.50 < m < 1.00$, at 180 to 350° C.

EFFECT OF THE INVENTION

The present invention has made it possible to provide an anticorrosive coating composition which uses a pollution-free rust preventive pigment excluding heavy metals and also, exhibits anticorrosive ability equal or superior to a lead compound or a chromic acid compound even if the pigment is blended in various binder resins, and also an anticorrosive coating composition having high storage stability.

DETAILED DESCRIPTION OF THE INVENTION

The present invention will be explained in detail.

Though the detailed mechanism of the rust preventive action of condensed calcium phosphate in the pollution-free rust preventive pigment to be used in the present invention is not clarified, it is considered that the condensed calcium phosphate is dissolved a little in water under a corrosive atmosphere and a passivated film is formed on the surface of iron to prevent the generation of rust because the produced condensed phosphoric acid ions have very strong chelating power on metals.

The above condensed calcium phosphate to be used in the present invention needs using a single substance or mixture of a calcium component and a phosphorous component in the following atomic ratio (Ca/P=m): $0.50 < m < 1.00$ and preferably in the following atomic ratio m: $0.60 < m < 0.80$.

When the atomic ratio (Ca/P=m) of a calcium component to a phosphorous component in the single substance or mixture is $m \leq 0.5$, this is undesirable because the amount of condensed phosphoric acid ions to be eluted is excessive, the blistering of the coating film is caused, leading to a reduction in rust preventive effect. When the atomic ratio m is $m \geq 1.00$ on the other hand, this is undesirable because the amount of elution of condensed phosphoric acid ions required to form the passivated film is too low and also it is difficult to produce the condensed calcium phosphate.

The above condensed calcium phosphate to be used in the present invention is preferably a compound represented by the following formula (1).

$$Ca_xH_y(P_nO_{3n+1})_z \qquad (1)$$

In the formula, x denotes a real number from 1 to 4, y denotes a real number from 0 to 2, z denotes a real number from 1 to 2 and n denotes an integer from 2 to 6, provided that $2x+y=(n+2)z$.

The above condensed calcium phosphate represented by the formula (1) includes compounds having an optional number of crystal waters.

Typical examples of the condensed calcium phosphate represented by the formula (1) include $CaH_2P_2O_7$, $Ca_2P_2O_7$, $Ca_3H_2(P_2O_7)_2$, $Ca_4H_2(P_3O_{10})_2$ and $Ca_4P_6O_{19}$. These compounds are preferably used singly or as a mixture of them.

The condensed calcium phosphate represented by the formula (1) can be identified mainly by using an X-ray diffraction method.

The condensed calcium phosphate to be used in the present invention may be in the state of a single crystal or a mixture of various crystal states (including an amorphous state).

The condensed calcium phosphate that is a constituent of the pollution-free rust preventive pigment to be used in the present invention is preferably produced by baking a mixture of the foregoing calcium component and phosphorous component at a temperature of 180 to 350° C. and preferably 200 to 290° C. When the baking temperature is less than 180° C., phosphorous acid is not condensed and therefore, no condensed calcium phosphate is obtained. When the baking temperature exceeds 350° C., the produced condensed calcium phosphate is almost converted into calcium methaphosphate and therefore, no condensed calcium phosphate having rust preventive ability can be obtained.

Although no particular limitation is imposed on the time required for baking a mixture of the above calcium component and phosphorous component, the baking time is preferably 1 to 30 hours. The condensed calcium phosphate after baked may be subjected to processes such as milling or classification according to use and the like.

Preferable examples of the phosphorous component include orthophosphoric acid, polyphosphoric acid, phosphorous acid and diphosphorous pentoxide. Also, preferable examples of the calcium component include single calcium, calcium oxide, calcium hydroxide, calcium carbonate, calcium monohydrogenphosphate, calcium dihydrogenphosphate, tricalcium phosphate, calcium pyrophosphate and calcium dihydrogenpyrophosphate. Calcium nitrate, calcium acetate and calcium chloride tend to deteriorate the rust preventive ability of the pigment because water-soluble ions are left in the baked product.

Next, the inventors of the present invention have searched a solid base to be combined with the condensed calcium phosphate to develop a pollution-free rust preventive pigment excluding zinc and as a result, found that alkali earth metal compounds exhibit the effect of improving good rust preventive ability. Examples of the alkali earth metal compounds include oxides, hydroxides, silicates or carbonates of calcium, magnesium or strontium. Though all these compounds have good rust preventive ability, it is particularly preferable to use magnesium compounds.

The amount of the alkali earth metal compound is 0 to 90% by weight and preferably 0.1 to 60% by weight based on the total amount of the pollution-free rust preventive pigment. Therefore, in this case, the amount of the condensed calcium phosphate is 10 to 100% by weight and preferably 40 to 99.9% by weight based on the total amount of the pollution-free rust preventive pigment. Particularly, when a strongly basic oxide or hydroxide is used as the alkali earth metal compound, the amount of the alkali earth metal compound is 0.5 to 20% by weight based on the total amount of the pollution-free rust preventive pigment. These alkali earth metal compounds may be used either singly or in combinations of two or more.

When the mixing ratio of the condensed calcium phosphate is less than the above range, the amount of elution of the condensed phosphoric acid ions that is a factor exhibiting rust preventive action is reduced, thereby producing insufficient rust preventive effects whereas when the ratio exceeds the above range, the alkali earth metal compound is decreased, whereby the solid acidity which the condensed calcium phosphate has cannot be neutralized and the rust preventive effect based on the condensed calcium phosphate tends to decrease.

The alkali earth metal compound may be used as a mixture with the condensed calcium phosphate or by baking the mixture.

Also, the pollution-free rust preventive pigment to be used in the present invention allows a silicon compound to be further contained in a mixture of the aforementioned condensed calcium phosphate and the alkali earth metal compound. When the silicon compound is mixed, corrosive products on a base metal can be fixed, which is preferable to improve the rust preventive effect. As the silicon compound, colloidal silica, silica synthesized by a wet method or vapor phase method or a natural mineral containing silica in the form of silicon dioxide may also be used in general and there is no particular limitation to the material to be used as the silicon compound. The amount of the silicon compound is usually 0 to 80% by weight and preferably 0.5 to 50% by weight based on the total amount of the pollution-free rust preventive pigment.

The pollution-free rust preventive pigment to be used in the present invention produces sufficient rust preventive effects when the aforementioned condensed calcium phosphate is used singly or in combination with the alkali earth metal compound. When an organic phosphonic acid or carboxylic acid having a chelating function and/or neutralized salts of these acids are further contained, this brings about a synergetic effect, producing higher rust preventive effects.

Examples of the organic phosphonic acid having a chelating function and used in the pollution-free rust preventive pigment to be used in the present invention include aminoalkylenephosphonic acids such as nitrilotrismethylenephosphonic acid, nitrilotrisethylenephosphonic acid, nitrilotrispropylenephosphonic acid and nitrilotrisdiethylmethylenephosphonic acid, ethylenediaminetetraalkylenephosphonic acids such as ethylenediaminetetramethylenephosphonic acid, ethylenediaminetetraethylenephosphonic acid and ethylenediaminetetrapropylenephosphonic acid, alkyl-1-1-hydroxy-1,1-diphosphonic acids such as methane-1-hydroxy-1,1-diphosphonic acid, ethane-1-hydroxy-1,1-diphosphonic acid and propane-1-hydroxy-1,1-diphosphonic acid and 2-hydroxyphosphonoacetic acid. Examples of the carboxylic acids having a chelating function include citric acid, malic acid, oxalic acid, malonic acid, succinic acid, itaconic acid, maleic acid, glycolic acid, mercaptoacetic acid, thioglycolic acid, salicylic acid, sulfosalicylic acid, anthranyl acid, N-methylanthranyl acid, 3-amino-2-naphthoic acid, 1-amino-2-naphthoic acid, 2-amino-1-naphthoic acid, 1-aminoanthraquinone-2-carboxylic acid, tannic acid and gallic acid.

Examples of the neutralized salts of these organic phosphonic acids or carboxylic acids include those obtained by neutralizing a part or all of the above compounds by alkali metals alkali earth metals, aluminum, ammonium ions or an amino group.

The amount of the organic phosphonic acid or carboxylic acid and/or neutralized salts of these acids is, though not particularly limited to, generally 0 to 20% by weight and preferably 2 to 15% by weight based on the total amount of the pollution-free rust preventive pigment.

When the above condensed calcium phosphate, alkali earth metal compound and organic phosphonic acid or carboxylic acid and/or its neutralized salt are mixed, any of dry mixing and wet mixing may be adopted. Particularly when the pollution-free rust preventive pigment is used as an anticorrosive coating, these components are reacted in advance in a wet system using a wet mixing method and the product after dried is, for example, baked or milled when there is a fear that the alkali component of the alkali earth metal compound reacts with the resin to cause gelation or thickening.

The pollution-free rust preventive pigment to be used in the present invention may be subjected to surface treatment according to the need in consideration of the dispersibility of the pigment particles and miscibility with a vehicle when applied to an anticorrosive coating. As the method of surface treatment, the usual method carried out to attain the above object may be used. For example, the pigment may be surface-treated using one or two or more types selected from a higher fatty acid or its derivative, acidic phosphate or its derivative, rosilic acid or its derivative and silane coupling agents.

Examples of the higher fatty acid or its derivative include capric acid, lauric acid, myristic acid, palmitic acid, stearic acid, oleic acid, linolic acid and linoleic acid, or their metal salts or amides. Examples of the acidic phosphate or its derivative include monomethyl acid phosphate, dimethyl acid phosphate, diethyl acid phosphate, methylethyl acid phosphate, n-propyl acid phosphate, isopropyl acid phosphate, n-butyl acid phosphate and isobutyl acid phosphate. Examples of the rosilic acid or its derivative include rosilic acid, natural rosin or its meal salts or amides. Examples of the silane coupling agent include vinyltrichlorosilane and vinyl/tris(β-methoxyethoxy)silane.

Specific examples of the binder resin to be used in the present invention include oil resins, alkyd resins, chlorinated rubber resins, acrylic resins, polyester resins, epoxy resins, epoxy ester resins, urethane resins, fluororesins, moisture-curable polyurethane resins, acryl modified silicone resins and butyral resins. The form of the coating and resin may be any of a solvent type, water type and non-solvent type. The novel pollution-free rust preventive pigment to be used in the present invention is formulated in an amount of preferably 1 to 50 parts by weight, more preferably 3 to 50 parts by weight and particularly preferably 3 to 40 parts by weight based on 100 parts by weight of the solid content of the binder resin. Moreover, in the present invention, it is preferable to formulate a silane coupling agent to accomplish complexation of resin-rust preventive pigment-base material and to improve the adhesion among these materials.

Examples of the above oil resin include those described in the publication of JP-A No. 58-49757, for example, boiled oil, linseed oil, soybean oil, safflower oil and caster oil. Also, examples of the above alkyd resin include those described in the publication of JP-A No. 58-49757 and the publication of JP-A No. 62-195055, for example, oil-modified alkyd resins such as phthalic acid resins.

Specific and typical examples of the silane coupling agent include γ-chloropropyltrimethoxysilane, vinyltrichlorosilane, vinyltriethoxysilane, vinyltrimethoxysilane, vinyl tris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl) aminopropyltrimethoxysilane, γ-glycidoxypropylmethyldiethoxysilane and γ-glycidoxypropyldimethylethoxysilane. The silane coupling agent is added in an amount of 0.1 to 8 parts by weight and preferably 1 to 5 parts by weight based on 100 parts by weight of the binder resin. When the amount of the silane coupling agent is less than 0.1 parts by weight, the effect of complexation is low whereas when the amount exceeds 8 parts by weight, the stability of the coating tends to deteriorate.

An organic or inorganic type rust preventive agent may be formulated other than the novel pollution-free rust preventive pigment according to the case in the present invention. Specific and typical examples of the organic type rust preventive agent include conductive polyanilines having the ability to passivate the surface of a steel material and to uniform the potential, and those which serve to make the coating film adhere to a steel material firmly, for example, 2-benzothiazothiosuccinic acid, diphenylthiocarbazone, N,N-diphenylethylenediamine, S-diphenylcarbazide, phenocyazoline, 1,5-diphenyl-3-thiocarbohydrazide, 1,4-diphenyl-3-thiosemicarbazide, thiocarboanilide, thiobenzanilide, thioacetoamide, 2-mercaptobenzothiazole, benzotriazole, 1-hydroxy-benzotriazole, 2-mercaptobenzimidazole, 2-mercaptobenzoselenazole, 2-mercaptobenzoxazole, 5-mercapto-3-phenylthiadiazole-2-thione, 2-(o-hydroxyphenol)benzothiazole, 2,2'-dithiobis-(benzothiazole), dimethylhydantoin, pyrrole-2-carboxyaldehyde, 2,5-dimercapto-1,3,4-thiazole, 5-amino-1,3,4-thiadiazole -2-thiol, 3-amino-1,2,4-triazole, 3-amino-5-mercapto-1,2,4-triazole, 2-mercapto-1-methylimidazole, 2-mercaptothiazoline, 2-aminothiazole, 3,5-dimethylpyrazole, histidine, 1,10-phenanthroline and 1,8-diazabicyclo(5,4,0)undecene-7. These materials may be used either singly or in combinations of two or more. Also, typical examples of the inorganic type rust preventive agent include, besides an aluminum powder and zinc powder, rust preventive pigments such as aluminum phosphate, zinc phosphate, zinc phosphite, potassium phosphite, calcium phosphite, aluminum phosphite, zinc molybdate, zinc phosphorousmolybdate, aluminum phosphorousmolybdate, calcium molybdate and hydrocalumite. These compounds may be used either singly or as a mixture of two or more of these compounds. However, a chromium type and lead type are undesirable from the viewpoint of toxicity and the like.

The anticorrosive coating composition of the present invention is constituted of the rust preventive pigment and binder as essential components and, as required, various color pigments, extender pigments and solvents which are used in usual anticorrosive coatings and others including a drier, precipitation preventive agent, sagging preventive agent and chelating agent.

EXAMPLES

The present invention will be explained in detail by way of examples and comparative examples, which are not intended to be limiting of the present invention. In these examples, all designations of "%" and "parts" showing the concentration or content indicate "% by weight" and "parts by weight" respectively, unless otherwise noted.

(1. Synthesis of Condensed Calcium Phosphate A)

100 g of calcium carbonate and 173 g of commercially available 85% phosphoric acid (Ca/P atomic ratio: 0.67) were taken in a flask and reacted at 80° C. for 3 hours with stirring. The reaction solution was allowed to cool and then baked for 30 hours in a drier kept at 250° C. to synthesize a condensed calcium phosphate A. This condensed calcium phosphate A was a mixture of $CaH_2P_2O_7$, $Ca_4H_2(P_3O_{10})_2$ and the like.

(2. Synthesis of Condensed Calcium Phosphate B)

100 g of calcium carbonate and 154 g of commercially available 85% phosphoric acid (Ca/P atomic ratio: 0.75) were taken in a flask and reacted at 80° C. for 3 hours with stirring.

The reaction solution was allowed to cool and then baked for 30 hours in a drier kept at 250° C. to synthesize a condensed calcium phosphate B. This condensed calcium phosphate B was a mixture of $CaH_2P_2O_7$, $Ca_3H_2(P_2O_7)_2$, $Ca_4H_2(P_3O_{10})_2$ and the like.

(3. Synthesis of Condensed Calcium Phosphate C)

100 g of calcium carbonate and 113.7 g of polyphosphoric acid (Ca/P atomic ratio: 0.74) were taken in a flask and reacted at 80° C. for 3 hours with stirring. The reaction solution was allowed to cool and then baked for 30 hours in a drier kept at 230° C. to synthesize a condensed calcium phosphate C. This condensed calcium phosphate C was a mixture of $Ca_2P_2O_7$, $CaH_2P_2O_7$ and the like.

Examples 1 to 7 and Comparative Examples 1 to 3

The formulation of each coating containing the above condensed calcium phosphates/alkali earth metal compounds/organic phosphonic acids or carboxylic acids and/or their neutralized salts, binder resins (containing a curable agent) and silane coupling agents are shown in Table 1.

Each pollution-free rust preventive pigment and each binder resin as shown in Table 1 were dispersed using a sand mill with zirconia beads (φ: 1.5 mm) for 30 minutes to form a coating. When a test piece was produced, specified amounts of a curable component and a silane coupling agent were formulated and stirred by a disper until the mixture was uniformed.

(Production of a Test Piece)

The above coating was applied to a defatted and abraded cold-rolled steel plate JIS G3141 SPCC-SB (0.8 t×70×150 mm) by air spraying such that the dry thickness was 50 μm and dried at ambient temperature for 2 weeks to obtain a test piece.

(Evaluation of a Test Piece)

(1) Combined Cycle Test

A crosscut pattern extending to the base was formed on the lower half of the test piece by a cutter knife and a combined cycle test was carried out in 36 cycles according to JIS K 5621 to rate the degree of rust and the width of blister on the crosscut part.

<Criterion>

⊙: No disorder.

◯: 2 mm or less on one side.

Δ: 3 to 5 mm on one side.

x: 6 to 10 mm on one side.

xx: Tape width on one side.

(2) Spray Test

A cross-cut pattern extending to the base was formed on the lower half of the test piece by a cutter knife and a salt spray test was carried out for 550 hours according to JIS Z 2371 to rate the degree of rust and the width of blister on the crosscut part.

<Criterion>

⊙: No disorder.

◯: 2 mm or less on one side.

Δ: 3 to 5 mm on one side.

x: 6 to 10 mm on one side.

xx: Tape width on one side.

(3) Polarization Resistance after the Test Piece is Dipped in Brine

Each test piece was fitted with an acryl ring, which was then filled with 3% brine to measure the polarization resistance at the interface between the metal base and the coating film after 240 hours.

The polarization resistance was measured by using an under-film metal corrosion detector manufactured by Hokuto Denko (k.k.)/Dainippon Toryo Co., Ltd. As the polarization resistance increases, water less penetrates into the interface of the metal, showing that the coating film has higher adhesion and hence a higher anticorrosion effect.

<Criterion>

⊙: 100 MΩ·cm² or more, ◯: 10 to 99 MΩ·cm²,

Δ: 1 to 9 MΩ·cm², x: 0.9 MΩ·cm² or less.

The results of evaluation are shown in Table 2.

TABLE 1

| | | Formulation of Coating | | | | |
|---|---|---|---|---|---|---|
| No. | Phosphate | Pollution-free rust preventive pigment, alkali earth metal compound | Organic phosphonic acid or carboxylic acid and/or its neutralized salt | Binder resin | Curing agent | Silane coupling agent |
| Example 1 | Condensed calcium phosphate A 5 g | — | — | Acrylic resin solution (Note 1) 154 g | — | γ-aminopropyl-triethoxy-silane 10 g |
| Example 2 | Condensed calcium phosphate A 28 g | Calcium oxide 3.6 g | Citric acid 1.0 g | Acryl modified silicone resin solution (Note 2) 200 g | Organic tin solution (Note 8) 71.5 g | γ-aminopropyl-triethoxy-silane 4.6 g |
| Example 3 | Condensed calcium phosphate A 40 g | Magnesium oxide 5 g | — | Epoxy resin solution (Note 3) 200 g | Polyamidoamine resin solution (Note 9) 101.6 g | γ-glycidoxypropyl-trimethoxy-silane 4.6 g |
| Example 4 | Condensed calcium phosphate B 16 g | Magnesium oxide 3.5 g | 2-Hydroxy-phosphono-acetic acid 0.5 g | Soybean oil modified alkyd resin solution (Note 4) 143 g | — | — |
| Example 5 | Condensed calcium phosphate B 8 g | Calcium methasilicate 1.5 g | Citric acid 0.5 g | Fluororesin solution (Note 5) 154 g | Isocyanate solution (Note 10) 71.2 g | γ-glycidoxypropyl-trimethoxy-silane 1.8 g |

TABLE 1-continued

| No. | Phosphate | Pollution-free rust preventive pigment, alkali earth metal compound | Organic phosphonic acid or carboxylic acid and/or its neutralized salt | Binder resin | Curing agent | Silane coupling agent |
|---|---|---|---|---|---|---|
| Example 6 | Condensed calcium phosphate C 39 g | — | Tannic acid 3 g | Moisture-curable type polyurethane resin (Note 6) 100 g | — | γ-glycidoxypropyl-trimethoxy-silane 4.8 g |
| Example 7 | Condensed calcium phosphate C 32 g | Magnesium oxide 13 g | — | Epoxy resin (Note 7) 100 g | Aqueous polyamine solution (Note 11) 270 g | γ-glycidoxypropyl-trimethoxy-silane 14 g |
| Comparative Example 1 | — | — | — | Epoxy resin (Note 7) 100 g | Aqueous polyamine solution (Note 11) 270 g | γ-glycidoxypropyl-trimethoxy-silane 5.0 g |
| Comparative Example 2 | Aluminum tripolyphosphate 5 g | — | — | Soybean oil modified alkyd resin solution (Note 4) 143 g | — | — |
| Comparative Example 3 | Commercially available strontium chromate 10 g | — | — | Moisture-curable type polyurethane resin (Note 6) 100 g | — | — |

(Note 1)
Acrylic resin solution
Hydroxyl value of the resin: 80 mg KOH/g, number average molecular weight: 12000, solid content: 65%
(Note 2)
Acryl modified silicone resin solution
Acryl resin containing an alkoxysilyl group, number average molecular weight: 12000, solid content: 50%
(Note 3)
Epoxy resin solution
Bisphenol A type epoxy resin, epoxy equivalent: 450, solid content: 50%
(Note 4)
Soybean oil modified alkyd resin solution
Oil length: 62, solid content: 70%
(Note 5)
Fluororesin solution
Hydroxyl value of the resin: 45 mg KOH/g, number average molecular weight: 7000, solid content: 65%
(Note 6)
Moisture-curable type polyurethane resin
Trade name: "Sumijule E21", manufactured by Sumitomo Bayer Urethane Co., solid content: 100%
(Note 7)
Epoxy resin
Trade name: "Epicoat 816A", manufactured by Yuka Shell Epoxy (sha), solid content: 100%
(Note 8)
Organic tin solution
Xylene solution of dibutyltin dilaurate, solid content: 14%
(Note 9)
Polyamidoamine solution
Amine value: 75 mg KOH/g, solid content: 24%
(Note 10)
Isocyanate solution
Butyl acetate solution of hexamethylenediisocyanate, solid content: 25%
(Note 11)
Aqueous polyamine solution
Trade name: "Epilink Dp700", manufactured by Air Products and Chemicals, Inc., amine value: 300 mg KOH/g, solid content: 55%

TABLE 2

| | Combined cycle test | Salt spray test | Polarization resistance after dipping in brine (M Ω · cm²) |
|---|---|---|---|
| Example 1 | ○ | ○ | ○ |
| Example 2 | ⊙ | ⊙ | ⊙ |
| Example 3 | ⊙ | ⊙ | ⊙ |
| Example 4 | ○ | ○ | ○ |
| Example 5 | ⊙ | ○ | ○ |
| Example 6 | ⊙ | ⊙ | ⊙ |
| Example 7 | ⊙ | ⊙ | ⊙ |
| Comparative Example 1 | XX | XX | X |
| Comparative Example 2 | X | X | X |
| Comparative Example 3 | X | Δ | X |

Examples 8 to 17 and Comparative Examples 4 to 9

The condensed calcium phosphates A to C prepared in the above manner, alkali earth metal compounds, or organic phosphonic acids or carboxylic acids and/or their neutralized salts were dry-mixed in the formulation ratio shown in Table 3 to produce pollution-free rust preventive compositions of Examples 8 to 17.

Also, calcium methaphosphate (not condensed calcium phosphate) and magnesium oxide were mixed in Comparative Example 4 and zinc phosphate-containing aluminum tripolyphosphoric acid ("K-FRESH", manufactured by Teika (k.k.) (aluminum tripolyphosphate is a compound represented by the above formula (1) wherein z is 3) and calcium methasilicate were mixed in Comparative Example 5, in the formulation ratios shown in Table 3 in a dry system to make rust preventive pigments. Zinc phosphate-containing aluminum tripolyphosphate ("K-WHITE AZP500", manufactured by Teika (k.k.)) as Comparative Example 6, calcium-modified aluminum tripolyphosphate ("K-WHITE Ca650", manufactured by Teika (k.k.)) as Comparative Example 7, zinc oxide-modified aluminum tripolyphosphate ("K-WHITE #105", manufactured by Teika (k.k.)) as Comparative Example 8 and zinc phosphate ("ZPF", manufactured by Sakai Chemical Industry Co., ltd.) as Comparative Example 9, were each used for a rust preventive pigment. It is to be noted that Comparative Examples 6 to 9 were commercially available rust preventive pigments.

TABLE 3

| Ingredients | | Sample No. Example | | | | | |
|---|---|---|---|---|---|---|---|
| | | 8 | 9 | 10 | 11 | 12 | 13 |
| Phosphate | Condensed calcium phosphate A | 100 | 85 | 90 | | | |
| | Condensed calcium phosphate B | | | | 95 | 70 | |
| | Condensed calcium phosphate C | | | | | | 65 |
| | Calcium methaphosphate | | | | | | |
| | Aluminum tripolyphosphate | | | | | | |
| Alkali earth metal compound | Calcium oxide | | 15 | | | | |
| | Magnesium oxide | | | 10 | 5 | | |
| | Calcium methasilicate | | | | | 30 | 35 |
| Organic phosphonic acid or carboxylic acid and/or its neutralized salt | 2-hydroxy-phosphonoacetic acid | | | | | | |
| | Citric acid | | | | | | |
| | Calcium citrate | | | | | | |
| | Tannic acid | | | | | | |

| Ingredients | | Sample No. | | | | | |
|---|---|---|---|---|---|---|---|
| | | Example | | | | Comparative Example | |
| | | 14 | 15 | 16 | 17 | 4 | 5 |
| Phosphate | Condensed calcium phosphate A | 80 | | | | | |
| | Condensed calcium phosphate B | | 86 | 88 | | | |
| | Condensed calcium phosphate C | | | | 97 | | |
| | Calcium methaphosphate | | | | | 95 | |
| | Aluminum tripolyphosphate | | | | | | 80 |
| Alkali earth metal compound | Calcium oxide | 17 | 11 | 9 | | | |
| | Magnesium oxide | | | | | 5 | |
| | Calcium methasilicate | | | | | | 20 |
| Organic phosphonic acid or carboxylic acid and/or its neutralized salt | 2-hydroxy-phosphonoacetic acid | 3 | | | | | |
| | Citric acid | | 3 | | | | |
| | Calcium citrate | | | 3 | | | |
| | Tannic acid | | | | 3 | | |

Next, the compositions containing the following components including the pollution-free rust preventive pigments and commercially available rust preventive pigments described in Table 3 and obtained in Examples 8 to 12 and Comparative Examples 4 to 6 (Comparative Example 6: commercially available product, non-described in Table 3) were each dispersed together with 100 g of zirconia beads (φ: 1.5 mm) by using a sand mill for 30 minutes to form a coating.

| | |
|---|---|
| Soybean oil-modified alkyd varnish (manufactured by Dainippon Toryo Co., Ltd., oil length: 62, heating residue: 70%) | 30.0 g |
| Pollution-free rust preventive pigment which is described in Table 3 or available on the market | 4.8 g |
| Titanium dioxide (rutile type) | 15.0 g |
| Sedimentating barium sulfate | 21.0 g |
| 6% cobalt naphthenate | 1.3 g |
| Anti-skinning agent | 0.5 g |
| Sagging preventive | 1.0 g |

Next, the compositions containing the following components including the pollution-free rust preventive pigments and commercially available rust preventive pigments described in Table 3 and obtained in Examples 13 to 17 and Comparative Examples 7 to 9 (commercially available product, non-described in Table 3) were each dispersed together with 100 g of zirconia beads (φ: 1.5 mm) by using a sand mill for 30 minutes to form a coating.

| | |
|---|---|
| Boiled oil (soybean oil) | 30.0 g |
| Pollution-free rust preventive pigment which is described in Table 3 or available on the market | 8.9 g |
| Titanium dioxide | 15.0 g |
| Sedimentating barium sulfate | 21.0 g |
| 6% cobalt naphthenate | 1.3 g |
| Anti-skinning agent | 0.5 g |
| Sagging preventive | 1.0 g |

(Production of a Test Piece)

The above coating was applied to a defatted and abraded cold rolled steel plate JIS G3141 SPCC-SB (0.8 t×70×150 mm) by using a brush such that the dry thickness was 25 μm, the same coating operation was repeated and then the coating film was dried at ambient temperature for 2 weeks to obtain a test piece having a dry thickness of 50 μm.

(Evaluation of a Test Piece)

(1) Combined Cycle Test

A crosscut pattern extending to the base was formed on the lower half of the test piece by a cutter knife and a combined cycle test was carried out according to JIS K 5621.

As the criterion, the number of cycles until rust or blister occurred in a 3 mm-area on one side in the vicinity of the crosscut part was adopted.

(2) Spray Test

A cross-cut pattern extending to the base was formed on the lower half of the test piece by a cutter knife and the test piece was then allowed to stand in a salt spray tester kept at 35° C. to spray 5% brine in an amount of 1 kg/cm² per hour on the coating film.

As the criterion, the time required until rust or blister occurred in a 3 mm-area on one side in the vicinity of the crosscut part was adopted.

(3) Test for Storage Stability

The coatings obtained in Examples 8 to 17 and Comparative Examples 4 to 9 were each filled in a 250 ml mayonnaise bottle, which was then sealed with a lid and kept in a thermostat kept at 50° C. for 30 days to carry out a test for storage stability of the coating.

The viscosities of the coating before and after the test were measured by a B-type viscometer and also, the grain sizes of the coating before and after the test were measured by a fineness gage. As to the evaluation, the case where a change in viscosity before and after the test was less than 10% and there is no change in grain size was rated as "○" and the case where a change (thickening) in viscosity before and after the test was 10% or more and an increase in viscosity was observed was rated as "x".

The results of evaluation are shown in Table 4.

Example 8 using zinc oxide-modified aluminum tripolyphosphate and Comparative Example 9 using zinc phosphate, the storage stability of the coating was unsatisfactory.

INDUSTRIALLY APPLICABILITY

The present invention provides an anticorrosive coating composition which uses a pollution-free rust preventive pigment excluding heavy metals and also, exhibits anticorrosive ability equal or superior to a lead compound or a chromic acid compound, and also an anticorrosive coating composition having high storage stability.

The invention claimed is:

1. An anticorrosive coating composition comprising a binder resin and a pollution-free (heavy metal-free) rust preventive pigment containing a condensed calcium phosphate produced by baking a single substance or mixture of a calcium component and a phosphorous component in the following atomic ratio (Ca/P=m): 0.50<m <1.00, at 180 to 350° C., wherein the pollution-free rust preventive pigment further contains an organic phosphonic acid or a carboxylic acid having a chelating function or neutralized salts of the phosphonic acid or carboxylic acid.

TABLE 4

| No. | Combined cycle test | Salt spray test | Storage stability test | Combined cycle test after the storage stability test | Salt spray test after the storage stability test |
|---|---|---|---|---|---|
| Example 8 | 50C | 480 hours | ○ | 50C | 480 hours |
| Example 9 | 54C | 520 hours | ○ | 54C | 520 hours |
| Example 10 | 54C | 520 hours | ○ | 54C | 520 hours |
| Example 11 | 54C | 520 hours | ○ | 54C | 520 hours |
| Example 12 | 54C | 520 hours | ○ | 54C | 520 hours |
| Example 13 | 54C | 520 hours | ○ | 54C | 520 hours |
| Example 14 | 54C | 520 hours | ○ | 54C | 520 hours |
| Example 15 | 54C | 520 hours | ○ | 54C | 520 hours |
| Example 16 | 54C | 520 hours | ○ | 54C | 520 hours |
| Example 17 | 54C | 520 hours | ○ | 54C | 520 hours |
| Comparative Example 4 | 36C | 300 hours | ○ | 36C | 250 hours |
| Comparative Example 5 | 36C | 300 hours | ○ | 36C | 300 hours |
| Comparative Example 6 | 36C | 300 hours | X | 18C | 120 hours |
| Comparative Example 7 | 36C | 300 hours | ○ | 36C | 300 hours |
| Comparative Example 8 | 50C | 480 hours | X | 13C | 100 hours |
| Comparative Example 9 | 36C | 300 hours | X | 10C | 100 hours |

As is clear from the results shown in Table 4, the examples of the present invention had good rust preventive characteristics of the coating film and good storage stability of the coating.

On the other hand, Comparative Example 4 using calcium methaphosphate and magnesium oxide as the pollution-free rust preventive pigment, Comparative Example 5 using calcium tripolyphosphate and calcium methasilicate as the pollution-free rust preventive pigment and Comparative Example 7 using calcium-modified aluminum tripolyphosphate as the pollution-free rust preventive pigment all had unsatisfactory rust preventive ability.

In the case of Comparative Example 6 using zinc phosphate-containing aluminum tripolyphosphate, Comparative 2. An anticorrosive coating composition according to claim 1, wherein the condensed calcium phosphate is a compound represented by the following formula (1):

$$Ca_xH_y(P_nO_{3n+1})_z \quad (1)$$

wherein x denotes a real number from 1 to 4, y denotes a real number from 0 to 2, z denotes a real number from 1 to 2 and n denotes an integer from 2 to 6, provided that $2x+y=(n+2)z$.

3. An anticorrosive coating composition according to claim 1, wherein the pollution-free rust preventive pigment further contains an alkali earth metal compound.

4. An anticorrosive coating composition according to claim 1, wherein the pollution-free rust preventive pigment further contains a silane coupling agent.

5. An anticorrosive coating composition according to claim 1, wherein the pollution-free rust preventive pigment has the atomic ratio m of a calcium component to a phosphorous component which is in the range of $0.60<m<0.80$.

6. An anticorrosive coating composition according to claim 1, wherein the pollution-free rust preventive pigment is characterized in that it is a condensed calcium phosphate selected from the group consisting of $Ca_3H_2(P_2O_7)_2$, $Ca_4H_2(P_3O_{10})_2$ and $Ca_4P_6O_{19}$ and mixtures of these compounds.

7. An anticorrosive coating composition according to claim 1, wherein the pollution-free rust preventive pigment is obtained by baking the mixture at 200 to 290° C.

8. An anticorrosive coating composition according to claim 1, wherein the condensed calcium phosphate is contained in an amount of 1 to 50 parts by weight based on 100 parts by weight of the solid content of the binder resin.

9. An anticorrosive coating composition according to claim 1, wherein the binder resin is characterized in that it is selected from the group consisting of an oil resin, an alkyd resin, a chlorinated rubber resin, an acrylic resin, a polyester resin, an epoxy resin, an epoxy ester resin, a urethane resin, a fluororesin, a moisture-curable polyurethane resin, an acryl modified silicone resin and a butyral resin.

* * * * *